United States Patent [19]

Steffen et al.

[11] 4,256,029
[45] Mar. 17, 1981

[54] PRESSURE REDUCING EXHAUST METHOD AND STRUCTURE FOR VENTILATED GRAIN BINS

[76] Inventors: Sylvester L. Steffen; Vincent B. Steffen, both of R.R. 3, New Hampton, Iowa 50659

[21] Appl. No.: 950,785

[22] Filed: Oct. 12, 1978

[51] Int. Cl.³ .............................................. E04H 7/00
[52] U.S. Cl. .................................... 98/55; 34/230; 34/233
[58] Field of Search .................... 98/55, 52, 53, 54; 34/225, 230, 233, 26, 20, 30

[56] References Cited

U.S. PATENT DOCUMENTS

| 54,173 | 4/1866 | Kendrick | 34/230 |
|---|---|---|---|
| 2,849,806 | 9/1958 | Grahek | 98/55 |
| 3,136,240 | 6/1964 | Rabe | 98/55 |
| 3,426,445 | 2/1969 | Steffen | 98/55 |
| 3,546,893 | 10/1968 | Frudeger | 98/55 |
| 4,045,878 | 9/1977 | Steffen | 98/55 X |

Primary Examiner—Albert J. Makay
Assistant Examiner—Henry Bennett
Attorney, Agent, or Firm—Henderson & Sturm

[57] ABSTRACT

A push-pull air movement apparatus for enhancing the movement of air through grain stored within the apparatus including a grain storage bin, an intake fan for pushing air through the grain and an exhaust fan. The intake fan is connected to the bin and is in fluid communication with the stored grain. An exhaust fan is also provided and is connected to the bin for pulling and exhausting at least as much air volume from the stored grain as the intake fan means inserts.

1 Claim, 5 Drawing Figures

PRESSURE REDUCING EXHAUST METHOD AND STRUCTURE FOR VENTILATED GRAIN BINS

BACKGROUND OF THE INVENTION

The present invention relates generally to the ventilation of the storage environment for bulk-stored food grains, and more particularly to ventilation systems which force air through stored grain.

In the field of bulk storage of grain, it has been found useful to ventilate the stored grain in order to bring the grain to and keep the grain in a state of dormancy, a process more fully described in U.S. Pat. No. 4,045,878. One common type of grain storage bin used in this process is constructed with an empty chamber (plenum) below the grain bin. The top of the plenum, which is the bottom of the bin, ordinarily is perforated so that fans can blow air into the plenum thereby forcing the air upwardly through the grain and out a vent in the top of the bin. The prior art of U.S. Pat. No. 4,045,878 teaches that fans may be placed near the vent in the free space between the roof of the bin and the top of the grain to aid in the air circulation within the bin. The problem encountered with the prior art, however, is that as the grain depth increases, resistance to the flow of air increases. When the air resistance reaches a certain level, generally three inches static pressure (displacement of water column), occuring when grain depths are approximately 14 feet, the horsepower requirement of the plenum fans for achieving an adequate ventilation rate through the stored grain becomes prohibitive. In general, commercial grain storage bins are often filled in excess of 14 feet and consequently are not amenable to adequate ventilation and to maintaining the stored grain in an equilibrium state with the atmospheric air temperature and moisture level.

SUMMARY OF THE INVENTION

It is a teaching of this invention that fans of different designs, depending on the different grain bin ventilation functions, can be used to create a pressure differential (increased pressure on one end of bin and reduced pressure at another) within the grain, thereby enhancing the movement of air through the stored grain. For example, the plenum fans may have a design allowing them to blow large volumes of air against an over-ambient pressure which develops inside the lower plenum chamber. The exhaust fans, on the other hand, may have a design allowing them to evacuate at least as much air as the plenum fans introduce, but only against the outside ambient pressure. The exhaust fans, thus, create an under-ambient pressure near the top of the grain bin. The resulting pressure differential (increased pressure near the bottom and reduced pressure near the top) within the grain bin enhances the ventilation rate, making ventilation possible at depths in excess of 14 feet and distinguishing this invention from the prior art. Furthermore, this is accomplished at an energy rate less than expected, since the exhaust fans can operate at a lower horsepower rating than the plenum fans. Consequently, this invention, for the first time, makes it economically feasible for commercial grain storage businesses to store and maintain living grain.

This invention further teaches an exhaust port construction which allows the exhaust fans to be located on the bin sidewalls in close proximity to the stored grain. This results in the low pressure area in the bin being located as close as possible to the high pressure area in the plenum, again enhancing the push-pull ventilation process and distinguishing the invention from the prior art.

Further, since air and moisture move upwardly in unventilated grain, air and moisture accumulate in the upper region of the grain so that the ability to probe and sample the grain in these areas for inspection purposes is valuable. This invention teaches a construction allowing such probing from outside the bin without subjecting a human inspector to the hazards associated with entering the bin.

Another advantage of the instant design is that it permits the roofs on bins to be airtight, thereby allowing total ventilation control. This further permits an altei nating of the air-flow within the bin and an increased or decreased ventilation rate depending upon grain conditions.

Finally, this invention may be used in conjunction with the electronic control of the grain environment as disclosed in U.S. Patent Application Ser. No. 811,700 and U.S. Pat. No. 4,053,991. In addition, this invention teaches that appropriate modifications to commercial grain storage bins make the teachings of U.S. Patent Application Ser. No. 811,700 and U.S. Pat. No. 4,045,878 applicable, which teach management and preservation of living grain. These aforementioned Patents and Application are herein incorporated by reference.

It is an object of this invention to provide a structure and method for applying a positive pressure at one surface of stored grain and a negative pressure at another surface of the stored grain, thereby reducing the resistance to the flow of air caused by the column of grain and permitting construction of grain bins with greater depths than otherwise normally could be tolerated.

Another object is to provide a structure which allows the area of negative pressure to be located as close as possible to the area of positive pressure.

A further object is to provide a structure permitting an altering of the direction of air-flow in the grain.

A still further object is to provide for the mounting of airtight roofs on bins, thereby making it possible to have total control of the introduction of atmospheric air into the grain.

Another object of the present invention is to provide a structure allowing increased or decreased ventilation rates as required by conditions within the grain.

Still another object is to provide the capability for probing and sampling the moisture and heat accumulations in the upper region of the bin without requiring a person to enter the bin.

Other objects, advantages, and novel features of the present invention will become apparent from the following detailed description of the invention when considered in conjunction with the accompanying drawings.

DETAILED DESCRIPTION OF THE PREFERRED EMBODIMENT

Figure 1:
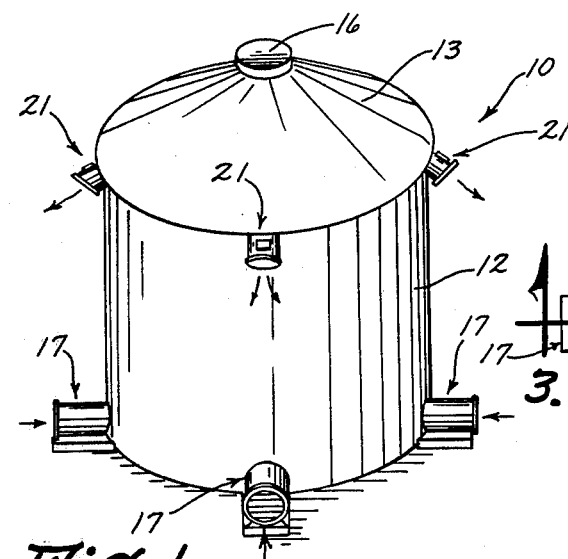
FIG. 1 is a perspective view of a grain bin utilizing present invention.

Referring now to the drawings where like reference numerals designate identical or corresponding parts throughout the several views, FIG. 1 shows a grain bin 10 constructed in accordance with the present invention. The grain bin 10 is constructed on a concrete foundation 11 (FIG. 3) and has cylindrically shaped sidewalls 12 attached to such concrete slab 11. A roof 13 is disposed upon and affixed to the top of the walls 12 as can best be seen in FIG. 3. An opening 14 is disposed in the top of the roof 13 and has a cover 16 thereon for the purpose of allowing the user to fill the bin 10 with grain through the opening 14 and then close the cover 16 to prevent moisture from entering through the opening 14.

A plurality of intake fan mechanisms 17 are disposed about the lower portion of the sidewalls 12 of the bin 10 for the purpose of forcing air through openings 18, which are disposed in the sidewall 12 of the bin wall 10 beneath a perforated floor 19. A plenum chamber 20 is formed between the floor 19, the concrete slab 11 and the lower sidewall 12.

Figure 2:
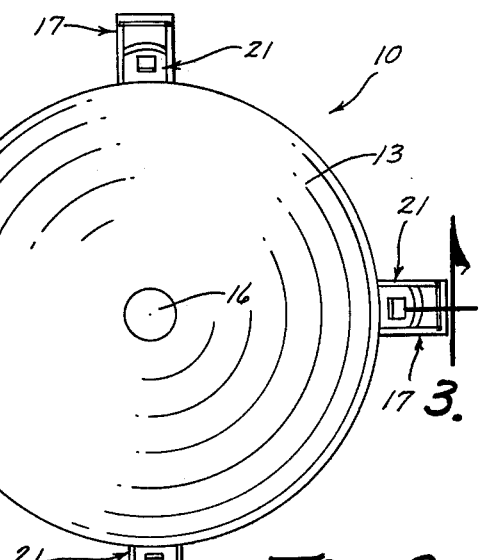
FIG. 2 is a top view of the grain drying bin of FIG. 1.
Figure 3:
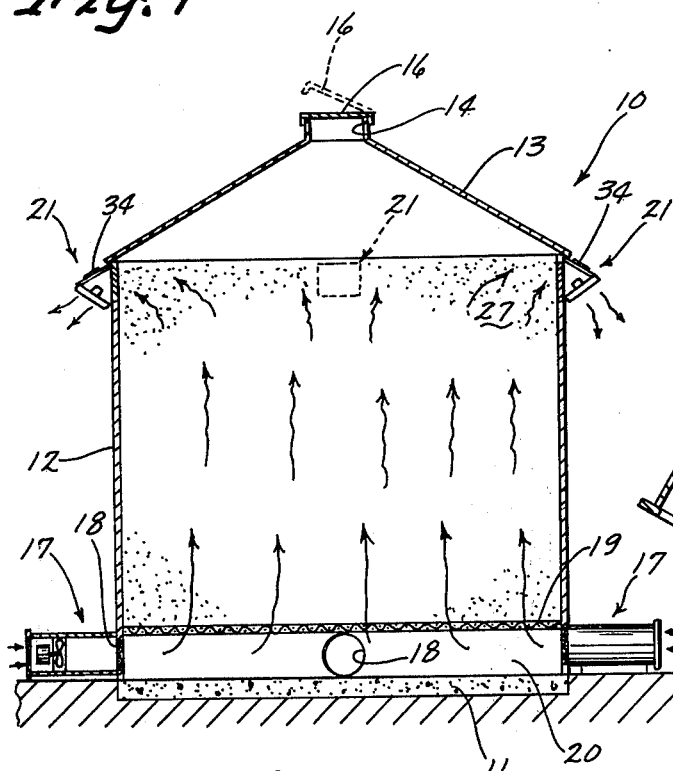
FIG. 3 is a cross sectional view taken along line 3—3 of FIG. 2.
Figure 4:
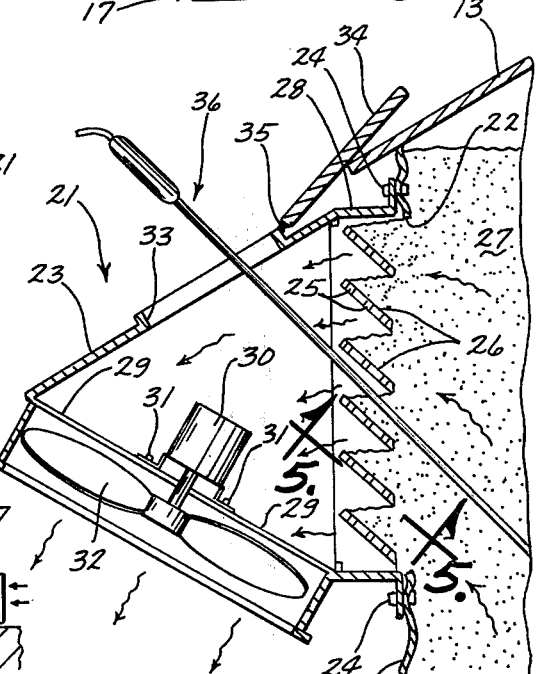
FIG. 4 is an enlarged cross sectional view like that of FIG. 3, but showing the exhaust port structure in greater detail.
Figure 5:
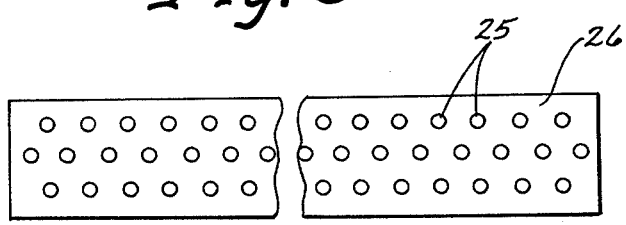
FIG. 5 is a view of a baffle member taken along line 5—5 of FIG. 4.

A plurality of exhaust fan structures 21 are disposed around the upper portion of the wall 12 as can best be seen in FIG. 1-3. Openings 22 (FIG. 4) are cut into the sidewall 12 of the bin 10 as can best be seen in FIG. 4. A cylindrical housing 23 is bolted directly to the bin wall 12 by means of nut and bolt fastening devices 24. Baffle members 26 are disposed across the openings 22 and affixed to the housing 23. These baffle members 26 are generally of the shape shown in FIG. 5 and are oriented in the position shown in FIG. 4. This prevents the grain 27 from falling out of the opening 22 beyond the baffle members 26 and yet readily allows air to flow out of the opening 22 to the atmosphere. It is to be understood that the baffle members 26 could be pivotally and adjustably oriented: but, in the preferred embodiment, they are merely secured entirely across the opening 22 and the portion 28 of the cylindrical housing 23. Brace members 29 are attached to the interior of the housing 23 and a fan motor 30 is bolted to such braces 29 by fastening member 31. The electric motor 30 is used to turn a fan blade member 32, as is well known.

An opening 33 is disposed in the top of the housing 23 and is selectively opened or closed by means of a door 34 pivotally attached to the cylindrical housing 23 by means of a hinge 35. The purpose of the opening 33 and the door 34 is to allow entry of a grain testing probe 36. Such a probe can be of many different types, such as one which measures the temperature of the grain or one which takes a sample of such grain for testing at another point, to give only two examples of possible types of testing probes 36.

In operation, the cover 16 of the bin 10 would be removed and the bin 10 would be filled with grain 27 by delivering such grain through the opening 14 in the top of the bin 10. Once such bin 10 had been filled with grain to a desired level, for example as shown in FIG. 3, the intake fans 17 and the exhaust fans 21 would be actuated to cause circulation of air through the bin as shown by the arrows in FIGS. 1, 3 and 4. As noted above, the addition of the fans 21, creating a negative pressure at the openings 22, and the pressure added to the plenum chamber 20 by the intake fan 17, creates a pressure differential between the plenum chamber and the top level of the grain to thereby readily enhance the flow there across and make more efficient use of the energy in operation of the fans. It also creates a very positive air flow and tends to prevent blockage of air within the grain as might occur in conventional air flow systems using a high level of grain 27 in the bin 10.

The type of fans 17 used to introduce air into the grain against pressure are high speed fans, whereas, because the exhaust fans 21 work in a pressure situation and with it to relieve the pressure, the design of fan 21 is different, i.e. a low-speed, low-horsepower, high-volume fan. The supporting interaction of multiple fans of both designs significantly reduce power requirements that would have to be applied to accomplish the same result with fans of only the high speed and high horsepower type.

Perforated baffles 26 offer less resistance to air movement than for example, a perforated wall for retaining the grain, and still prevent spillage while allowing access to grain for removing samples.

There are several typical fan types which can be used in this invention by means of example. There are, for example, centrifugal fans having a high horsepower of, for example 1750 rpm, and having a high-pressure and moderate-air flow or volume. Another fan type is a vane-axial fan which is typically a high-horsepower fan, for example having a rpm of 3450, moderate-pressure and high-volume. Still another type of fan is a tube-axial fan which, for example has a low-horsepower and operate at 1750 rpm, and at low-pressure and high-volume.

Application in the instant art is for low pressures, i.e. under 3½ for input fans, (with maximum possible ventilation rates desired) and a negative pressure for the exhaust fan.

| PERFORMANCE CHARACTERISTICS | | | | |
|---|---|---|---|---|
| | Free Air | 1"S.P. | 3"S.P. | 6"S.P. |
| Tube-Axial 1750 rpm 24" 2HP | 9600 cfm | 5200 | — | — |
| Vane-Axial 3450 rpm 24" 5HP | | 11000 | 8720 | — |
| Centrifugal 5HP | | 7000 | 6350 | 5000 |

A typical 10,000 bushel system calls for 2-5HP Vane-Axial fans. When the bin is full of grain (14½' to 15' depth), the static pressure will be approximately 3" so that air delivery is 2(8720)=17440 cfm. This bin holds about 10,000 bushels so that the cfm/bu is 1.74 cfm/bu. This ventilation rate is adequate with corn moistures up to 23%.

Since there is a positive flow of air out of the surface of the grain, exhaust fans 21 put in the air stream would be working under negative pressures, i.e., the flow of air itself, without power to the fans 21 would cause the fan 21 to rotate. If three 2 HP tube-axial fans 21 were put in the exhaust of the example cited, their combined air capacity under free air is 3(9600)=28,800 cfm. The effect of the tube-axial fans (1750 rpm) in the exhaust (pulling air) and the vane-axial (3450 rpm) on the plenum would be to achieve increased ventilation rates and greater economy. The air delivery from the high-speed, vane-axial fans would be increased by virtue of the reduction of pressure due to the capacity of the exhaust fans being greater than the capacity of the in-put fan.

Increases under certain conditions with proper matching of push-pull fans might accomplish double airflow compared to that which could be accomplished with fans of one design only. Typically, to double airflow with the application of a vane-axial (3450) or centrifugal fan requires 4 times the horsepower. Thus, very significant savings can be realized by combining designs.

Of great significance is the fact that this disclosure opens up the application of CHILLCURING technology to commercial grain storage, which until now has hardly been practical because of the necessity to limit grain depths when fans of a single design only are used for ventilating the grain.

Obviously many modifications and variations of the present invention are possible in light of the above teachings. It is therefore to be understood that, within the scope of the appended claims, the invention may be practiced otherwise than as specifically described.

We claim:

1. A push-pull air movement apparatus including a grain storage bin of the type having a plenum chamber formed in the lower part thereof and a gas-pervious floor forming the top of the plenum chamber for enhancing the movement of air through grain stored within said apparatus comprising:

a grain storage bin;

an intake fan means for pushing air through the grain, said intake fan means connected to the bin and in fluid communication with the stored grain, said intake fan means including a plurality of relatively high speed intake fans distributed about the wall of the plenum chamber;

an exhaust fan means connected to the bin for pulling and exhausting at least as much air volume from the stored grain as the intake fan means inserts, said exhaust fan means including a plurality of relatively large volume, low speed exhaust fans distributed about the top wall portion of the grain storage bin;

said grain bin having a base, a sidewall connected to said base, a roof connected to said sidewall and an opening in an upper portion of said sidewall leading to the grain storage portion of said bin;

a downwardly inclined cylindrical housing attached to said upper portion of said sidewall encompassing said opening; said large volume low speed exhaust fan means attached to and disposed within said cylindrical housing for pulling a large volume of air from the inside of the grain bin;

a plurality of perforated baffle means extending transversely across said opening for allowing said large volume of air to pass therethrough but preventing grain from passing therethrough, said baffle members extending upwardly and outwardly from said sidewalk to retain the grain within the confines of the grain storage portion of the bin; and means forming a closeable probe opening on the cylindrical housing.

* * * * *